Patented Jan. 28, 1930

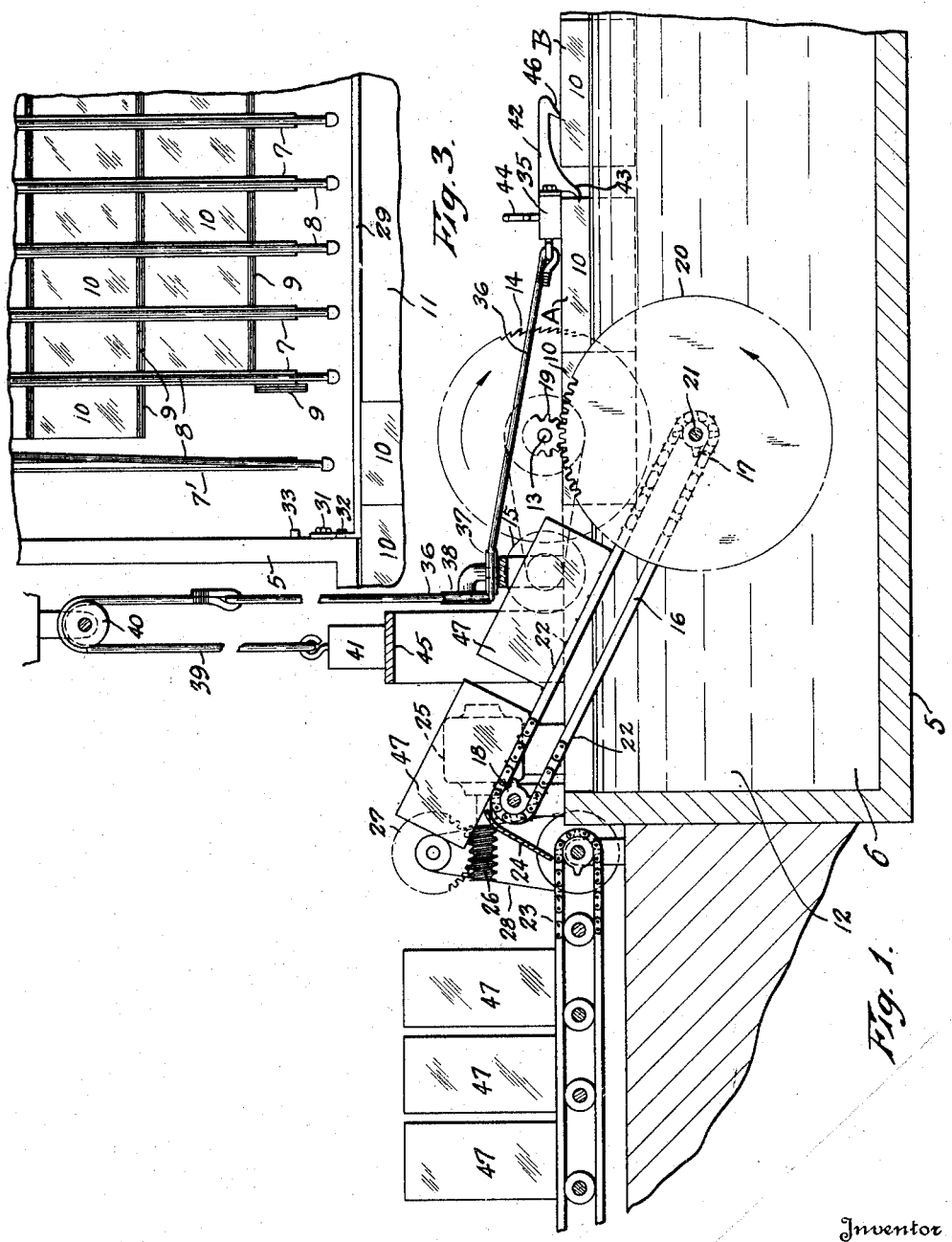

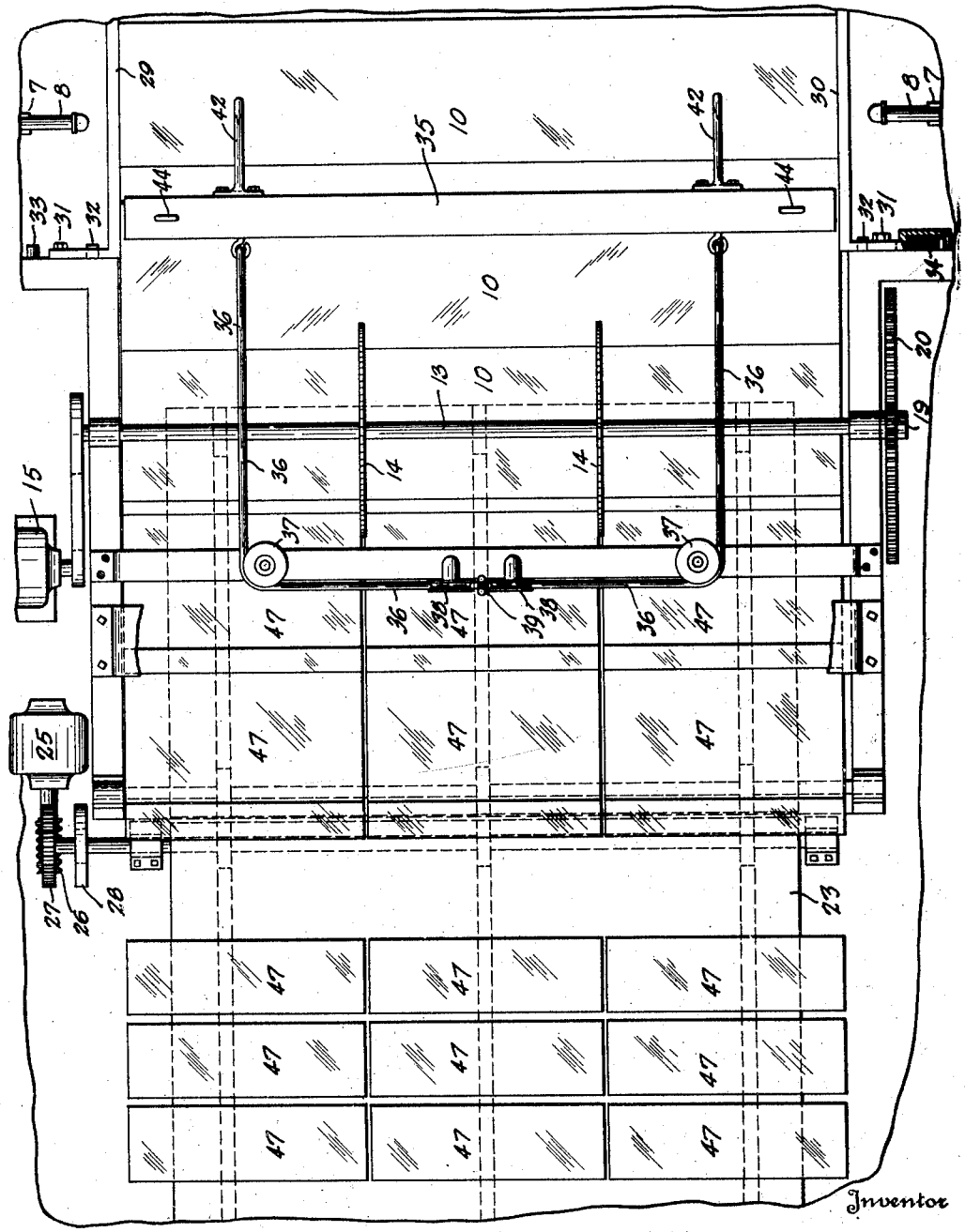

1,745,277

UNITED STATES PATENT OFFICE

ROBERT L. SHIPMAN, OF BRIDGEPORT, CONNECTICUT, ASSIGNOR OF ONE-HALF TO EARL D. SPRAGUE, OF BRIDGEPORT, CONNECTICUT

ICE-HARVESTING SYSTEM

Application filed July 29, 1926. Serial No. 125,640.

This invention relates to an ice harvesting system, and especially to a harvesting system for a plate type of ice making apparatus, such as disclosed in the patent of Shipman and Sprague, 1,615,411, Jan. 25, 1927.

In harvesting ice, especially in an ice making apparatus it is desirable to handle the ice as little as possible to reduce as much as possible injury to the ice. It is also desirable to saw the ice while it is floating in water so as to utilize the cushioning effect of the water to prevent breakage. With these conditions in view I have devised an ice harvesting system in which the blocks of ice are sawed to size while floating in the water, and have produced an apparatus which will automatically regulate the speed at which the ice is fed to and past the saws so that the saws operate with the greatest efficiency and with a minimum breakage of the ice.

Referring to the accompanying drawings in which I have illustrated one embodiment of my invention, Fig. 1 is a section through a portion of an ice making apparatus of the type disclosed in said patent to Shipman and Sprague and showing my improved harvesting device applied thereto.

Fig. 2 is a top plan view thereof, and

Fig. 3 is a top plan view of the section of the freezing means.

As disclosed in said above mentioned patent the apparatus comprises a tank 5 of suitable depth to hold water 6 to be frozen. Suspended in this tank at suitable spaced distances is a series of upright freezing plates 7 with freezing coils between them supplied with freezing fluid by the pipes 8. Also suspended in the tank between the freezing plates and extending at right angles thereto are the division plates 9 so that blocks of ice 10 are frozen between the plates of adjacent pairs, it being, of course, understood the plates are spaced to give blocks of the desired cross section, and the tanks and plates are usually of a depth to freeze blocks about eight feet in length. In order that these plates or strips may be handled for storage and distribution they are usually cut into about three blocks making two cuts for each of the original blocks but, of course, a fewer or greater number of cuts may be taken if found desirable. As described in said prior patent, the frozen blocks are freed from the plates by first heating the freezing plates one at a time and shifting them laterally away from the blocks, as indicated at 7' in Fig. 3, and then the division plates are heated to free the blocks and allow them to float on their sides in the water of the tank.

In order, as indicated above, to reduce as far as possible breakage in harvesting the ice, it is desirable to cut it while it is floating on the water so as to utilize the cushioning effect of the water for holding the ice. At one end of the freezing plates a portion of the tank is left clear to provide what I term a harvesting section 11, and it is preferred to place in the tank two sets of the freezing plates 7, as indicated in Fig. 2, and locate this harvesting section between them and extend this section clear across the tank. Thus the same harvesting section may be used for harvesting the ice from both sets of freezing plates. At one side of the tank this harvesting section is extended to form a bay 12 in which I locate the harvesting apparatus proper, this bay, of course, forming a continuation of the harvesting section so that the blocks of ice can be floated directly from the harvesting section to the harvesting mechanism in this bay.

As illustrated this mechanism comprises an arbor or shaft 13 carrying one or more saws 14 which are of the usual disc type, and this shaft is operated by any suitable mechanism, such as an electric motor 15. The saws are so located, as indicated in Fig. 1, that the lower portions thereof extend below the level of the water a proper distance to project through the blocks of ice as they float on the water, and therefore, these blocks may be floated past the saws and sawed while still floating in the water. It is a peculiar property of these saws that when allowed to run free in the water the propeller effect of the teeth on the water requires much more power to operate the saw at a given speed than when the saws are cutting ice, and furthermore, when the saws begin to emerge from a piece of ice the grabbing of the water by the exposed teeth of the saw tends to throw the ice away from the saw with great force, thus slowing down the speed of the saws and also interfering with the proper cutting of the ice block. For best results it is, therefore, necessary to control the ice in such a way as to expose the teeth of the saws to the water as little as possible and to also positively hold the ice cakes or strips during the sawing operation and to regulate the rate of movement past the saws.

For this purpose I locate in the bay portion of the harvesting section and immediately to the rear of the saws an elevator or conveyor 16. This elevator may be of any improved type, that shown being of the endless chain type comprising a suitable number of flexible chains running over sprockets 17 and 18 by which it is operated. It may be driven from either sprocket and it may be driven by a separate power means, such as a separate motor, or it may be driven from the saw shaft 13, as indicated in the drawing, there being a pinion 19 on the saw shaft meshing with the gear 20 on the sprocket shaft 21. In any case, however, the speed of the conveyor is so regulated as to prevent the ice passing too rapidly past the saws and also to remove the ice from the saws as rapidly as it is cleared therefrom. I prefer to locate this elevator or conveyor substantially, as indicated in Fig. 1, so that it is inclined with its lower end immediately to the rear of and below the saws so that as the ice is forced past the saws it is engaged by this conveyor and prevented from moving too rapidly past the saws or being thrown from the saws by the propeller action on the water as mentioned above. The outer surfaces of the links of the conveyor are provided with pins or other suitable means 22 to grip the ice and cause it to move with the conveyor. It will be apparent that this conveyor or elevator is used both to control or regulate the feed of the ice past the saws and also to lift or convey the sawed ice from the tank.

At the delivery end of this elevator or conveyor is located another conveyor or travelling platform 23 onto which the ice is delivered from the elevator 16. This conveyor or platform may extend directly into the storage house or it may be extended through to the delivery platform. It is preferred that this conveyor be located a suitable distance below the delivery end of the conveyor 16 and that suitable guides 24 be provided so that as the ice is delivered from the conveyor 16 it slides down and turns through a quarter revolution by these guides so that it is placed on edge on the conveyor 23, as shown in the drawing. It will, of course, be understood that the speed of the conveyor 23 is so regulated that the ice blocks stand close together. The conveyor may be operated by any suitable means, such as a motor 25, operated through a worm 26 and the gear 27 connected by a suitable chain drive 28 to the conveyor. As the ice is carried into the storage house on this conveyor it may be easily slid off, packed and stored, and as it is standing on edge the required handling is reduced to a minimum since the ice is ordinarily stored on edge.

As the ice strips or large blocks 10 are released from the freezing mechanism they are floated into the harvesting section 11 and in order to hold them in proper alignment and guide them to the saws a pair of guides 29 and 30 are placed on opposite sides of this harvesting section to engage the ends of the blocks and guide them to the saws. These guides are mounted so that they may be swung upwardly out of the way to allow the blocks to float under them from the freezing section into the harvesting section, and then after the harvesting section is filled with the ice blocks they are swung down to the guiding position. For instance, the guide 29 is mounted on pivots 31 and there are suitable stops 32 and 33 provided to maintain the guide either in the guiding or raised position respectively. One of the guides as the guide 30, besides being mounted so as to be swung upwardly out of position is also mounted so that it may yield outwardly to accommodate strips or cakes of ice of different lengths. This guide 30, therefore, is also mounted for lateral shifting movement and provided with springs 34 tending to hold it against the ends of the cakes of ice.

Means is also provided for positively feeding the ice to the saws. For this purpose some form of pushing or pulling means is provided. In the drawing I have shown a float 35 extending transversely of the harvesting section and connected adjacent its opposite ends to a pair of cables 36 guided over suitable pulleys 37 and 38 and connected to a third cable 39 running over a pulley 40 and connected to a weight 41. It will thus be seen that the weight will pull equally on the two cables 36 and they will be taken up at the same speed, and therefore, the pulling effect on the opposite ends of the float will always be equal and the ice presented in a position at right angles to the saws. The float has on its rear side ice hooks 42, and the harvesting section is filled with the strips or blocks of ice close together or engaging each other and then the float is drawn over with the hook 43 on the hook 42 engaging the last cake, the float being provided with eyes 44 so that the hook of any ice pole may be used to draw the float over the ice. The weight 41, therefore, will draw the ice in the harvesting section with a uniform pull into the saws. It is also preferred to provide a shelf or stop 45 for the weight 41 so that it cannot drop far enough to draw the float into the saws. The hooks 42 on the float are preferably provided with higher and rearwardly extending hooks 46 so that individual blocks or strips of ice may be placed in front of this drawing device. For instance, as shown in Fig. 1, the hook and float is positioned so as to draw forwardly on the block (A) and all other blocks in front of it. A block (B) may now be forced under the hook 46 and will be held thereby. The float may now be drawn over the block (B) by merely pulling rearwardly on the float so that the hook 43 will engage the right hand or rear side of the block (B) and thus upon operation any number of the blocks may be placed forwardly of the drawing means.

The operation will be obvious. It is preferred that before sawing the harvesting section is substantially filled with ice and with the blocks in contact, and then the plate formed by the blocks will be drawn at a uniform rate and pressure by the feed mechanism into the saws, but the elevator and conveyor 16 will engage the blocks as they pass the saws, as indicated in Fig. 1, and will prevent their being forced through or away from the saws by the propeller action of the saws on the water. It will also prevent jamming of the blocks on the saws as they pass the saws. In other words it will hold the blocks and will regulate the speed at which they pass by the saws to maintain the best and most efficient sawing conditions. As soon as the strip passes the saw the cut blocks 47 will be carried out of the tank by this elevator and deposited on the conveyor or platform 23.

It will thus be apparent that by this mechanism there will be a minimum breakage of the ice as all of the handling prior to the sawing and the sawing itself is carried on while the ice is floating in the water so that it is cushioned by the water, and the only handling of the ice out of the water is after it has been cut to the proper size for storage or distribution. With this system a whole plate of ice consisting of the blocks or strips in the harvesting section and comprising five to ten tons or more may be sawed and delivered automaticaly into the store room with practically no injury to the ice, and with the minimum amount of labor.

Having thus set forth the nature of my invention, what I claim is:

1. In an ice harvesting apparatus, a saw mounted to saw blocks of ice while floating in the water, means for positively feeding the blocks to the saw while the blocks are floating in the water, and an inclined movable conveyor extending into the water to the rear of the saw to remove the sawed blocks therefrom, said conveyor being so placed as to engage the block and regulate its rate of movement as it passes the saw.

2. In an ice harvesting apparatus, a saw mounted to saw blocks of ice while floating in the water, a movable inclined conveyor extending into the water to the rear of the saw and arranged to control the speed of movement of the block past the saw and to remove the sawed blocks from the water, and a second conveyor at the delivery end of the first conveyor located at a lower level than the delivery end of said first conveyor, and means between the two conveyors to turn the blocks through a partial revolution as they pass from the first to the second conveyor.

3. In an ice harvesting apparatus, a saw mounted to saw blocks of ice while floating in water and from their top sides only, and a movable conveyor mounted to the rear of the saw to remove the sawed blocks from the water, means to rotate the saw with its lower or cutting portion moving in the direction of movement of the block being sawed, said conveyor being mounted adjacent the saw and so speeded as to engage the blocks and control their speed past the saw during the sawing operation.

4. In an ice harvesting apparatus, a saw mounted to saw blocks of ice while floating in water and from the top side of the blocks only, means for rotating the saw with its lower or cutting portion moving in the direction of movement of the blocks past the saw, a movable conveyor mounted to the rear of the saw to remove the sawed blocks from the water, said conveyor being mounted adjacent the saw and so speeded as to engage the blocks and control their speed past the saw during the sawing operation, and a feeding device to feed a plurality of blocks in succession positively to the saw.

In testimony whereof I affix my signature.

ROBERT L. SHIPMAN.